United States Patent [19]

Dunn

[11] Patent Number: 4,497,036
[45] Date of Patent: Jan. 29, 1985

[54] PORTABLE COMPUTER

[75] Inventor: James P. Dunn, Westport, Conn.

[73] Assignee: Microffice Systems Technology, Fairfield, Conn.

[21] Appl. No.: 484,319

[22] Filed: Apr. 12, 1983

[51] Int. Cl.³ .............................................. G06F 7/00
[52] U.S. Cl. ................................................. 364/708
[58] Field of Search ... 364/200 MS File, 900 MS File, 364/708, 710

[56] References Cited

U.S. PATENT DOCUMENTS

D. 243,250  2/1977  Hazama ................................ 364/708
4,053,735  10/1977  Foudos ................................ 235/419

OTHER PUBLICATIONS

Attaché Computing by E. S. Kanter, *Microcomputing*, Jul. 1982, pp. 84-86.
Osborne Behind Guerrilla Lines, by D. Kline, Microcomputing, Jul. 1982, pp. 42-50.
Future Trends Take Shape at NCC, by F. I. Derfer, Microcomputing, Sep. 1982, pp. 38-46.
Byte Magazine, Apr. 1981, Future Trends in Personal Computing by Chris Morgan, pp. 4-6.

*Primary Examiner*—Gareth D. Shaw
*Assistant Examiner*—John G. Mills
*Attorney, Agent, or Firm*—Toren, McGeady and Stanger

[57] ABSTRACT

In the disclosed portable computer, a keyboard with keys for entering at least a full alphabet and ten digits is coupled to a computer system that includes a central processing unit which is in turn coupled to a display arrangement with a liquid crystal display. The entire computer is mounted in a case composed of a base and a cover hinged to the base. The base houses the computer system and the keyboard, and exposes the keyboard for operation by a user when the cover is open, while the cover houses the display arrangement and exposes the liquid crystal display on its inner surface. The cover is hinged at the edge of the base and, when closed, covers substantially the entire upper surface of the base.

32 Claims, 7 Drawing Figures

PORTABLE COMPUTER

BACKGROUND OF THE INVENTION

This invention relates to computers and particularly to battery-operable portable computers having word processing and other complex operating capabilities.

Battery-operated portable computers of the type which have recently been commercially introduced generally utilize liquid crystal displays in lieu of the CRT Display prevalent in larger microcomputers. They achieve substantial reductions in size by dispensing with conventional disc drives that accept software in the form of floppy discs, and by substituting tape cassette and microcassette storage devices therefor. However, such portable computers exhibit a number of serious disadvantages. Aside from their usually limited internal memories, cassette storage devices seriously slow down the speed with which an operator may use the computer. Also, the total surface area of a portable computer may be only the size of a telephone book or smaller. Hence, the keyboard that is necessary for operation of a computer competes with other facilities that must be accessible to the computer operator for surface space on the computer. As a result, the number of columns and rows of text which can be displayed on a battery-operated portable computer has heretofore been quite small. Also, operators have had to be satisfied either without, or with extremely slow, external storage capabilities.

An object of the invention is to overcome these difficulties.

SUMMARY OF THE INVENTION

According to a feature of the invention, these difficulties are overcome, at least in part, by providing the computer with a central processing unit, a full alphanumeric keyboard, and a display arrangement coupled to the central processing unit, by mounting the central processing unit and the keyboard in the base of a case so that the keyboard is exposed for operation by a user, and by mounting the liquid crystal display on the inner surface of the case's cover which is hinged at an edge of the upper surface of the base and, when closed, covers the entire upper surface of the base but, when open, exposes the keyboard and the display to the user.

According to another feature of the invention, the cover is hinged so that it flips back only to a predetermined angle suitable for the user.

According to another feature of the invention, the upper surface of the base has openings which form chambers for receiving cartridges that electrically connect to the central processing unit at the bottom of the chambers.

According to another feature of the invention, the cover has side walls that cover the sides of the base.

According to yet another feature of the invention, the computer's on-off switch is mounted in the base to respond to the position of the cover so that closing of the cover turns off the computer and opening the cover turns it on.

According to still another feature of the invention, the cover is mounted by providing the edge of the upper surface of the base with upstanding bearings that carry hinge pins which engage bearings in the edge of the cover. Preferably, a friction fit exists in the hinges or between the bearings so that the cover will rest in the last position to which it is moved. This makes the display position infinitely adjustable.

According to yet another feature of the invention, the keyboard includes "soft" function keys which instruct the central processing unit to perform special functions. The functions are established by the software and indicated as "labels" on a menu line in the display. Suitable symbols are affixed to the cover adjacent the labels along the edge of the liquid crystal display. The symbols are repeated on the function keys and each function key, when operated, instructs the central processing unit to perform the function then labeled on the LCD display. The function varies with the software and changes as the labels in the menu line are modified.

According to another feature of the invention, the function keys are aligned to a row closest to the display when the cover is open.

According to yet another feature of the invention, the cartridges include a cartridge shell which contains a printed circuit board that mounts at least one or more high-speed static CMOS RAMs and a battery source that provides power to the RAMs in the data retention mode. Preferably the data retention operation requires a voltage less than the RAMs read-write operation and the battery source has a voltage less than the computer operating voltage. The small battery is available continuously and prevents the data stored in the cartridge from being lost.

According to still another feature of the invention, the printed circuit boards in the cartridges form a connector adapted to connect into a socket connected to the central processing unit.

According to still another feature of the invention, the connector includes a plurality of contact fingers slightly spaced from the edge of the printed circuit board for engaging the socket, with one of the fingers being retracted slightly more than the others so that that finger makes contact last and breaks contact first; that finger being arranged to transmit power from the computer system to the internal parts of the cartridge printed circuit board. The computer power overrides the small battery for reading or writing.

The use of the internally powered cartridges for nonvolatility is based upon the recognition that in the data retention mode, the amount of power consumed by CMOS static RAMs is sufficiently small to allow the small battery to operate for five years or more. Their power is supplemented by computer power during operation in the read-write mode.

According to another feature of the invention, the display has up to eighty columns and up to 25 lines.

By hinging the cover at an edge of the upper surface of the base and making the cover large enough to overlie substantially the case's entire upper surface, the total surface available for the keyboard, the display and other accessories is substantially increased while the overall volume of the portable computer remains almost what it would have been without the cover, and at the same time the keyboard and display are protected from breakage and other damage during transport. Utilizing cartridges for external storage eliminates the need for power consuming motors and rather than decreasing the speed of data acquisition as in floppy disc drive arrangements, increases the access speed by a factor of up to 10,000. The function keys simplify the manner of operating the device for the operator, while using a cover actuated switch eliminates the need for extra switch space on the computer surface.

The above and other features of the invention are pointed out in the claims. Other objects and advantages of the invention will become evident from the following detailed description when read in light of the accompanying drawings.

DETAILED DESCRIPTION OF THE PREFERRED EMBODIMENTS

Figure 1:
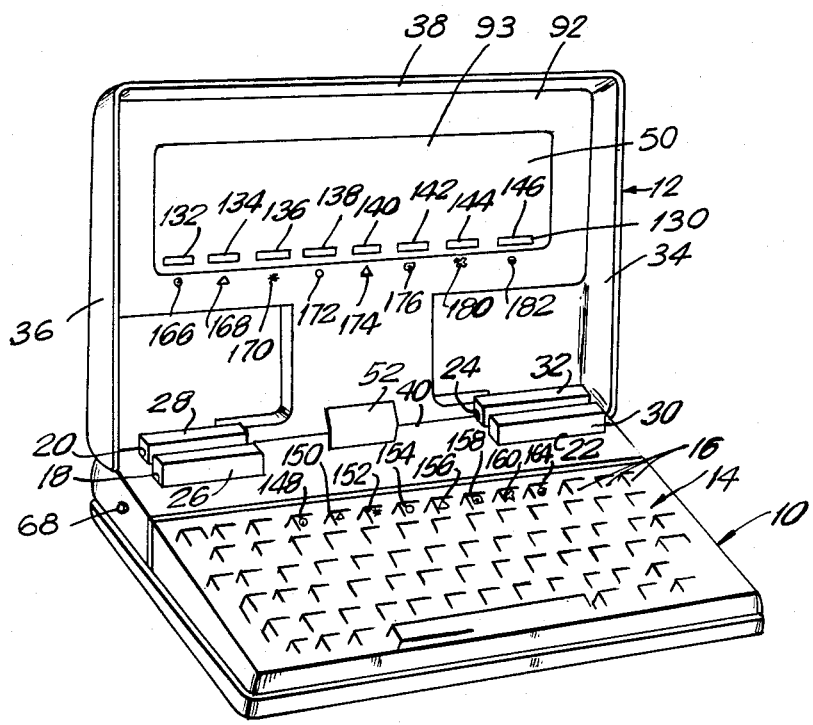
FIG. 1 is a perspective view of a battery-operated portable computer embodying feature of the invention.
Figure 2:
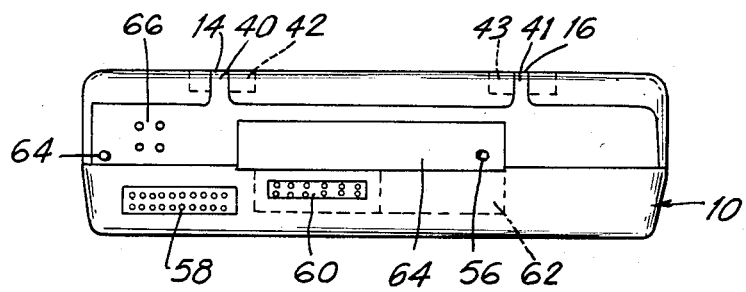
FIG. 2 is a rear view of the computer in FIG. 1.
Figure 3:
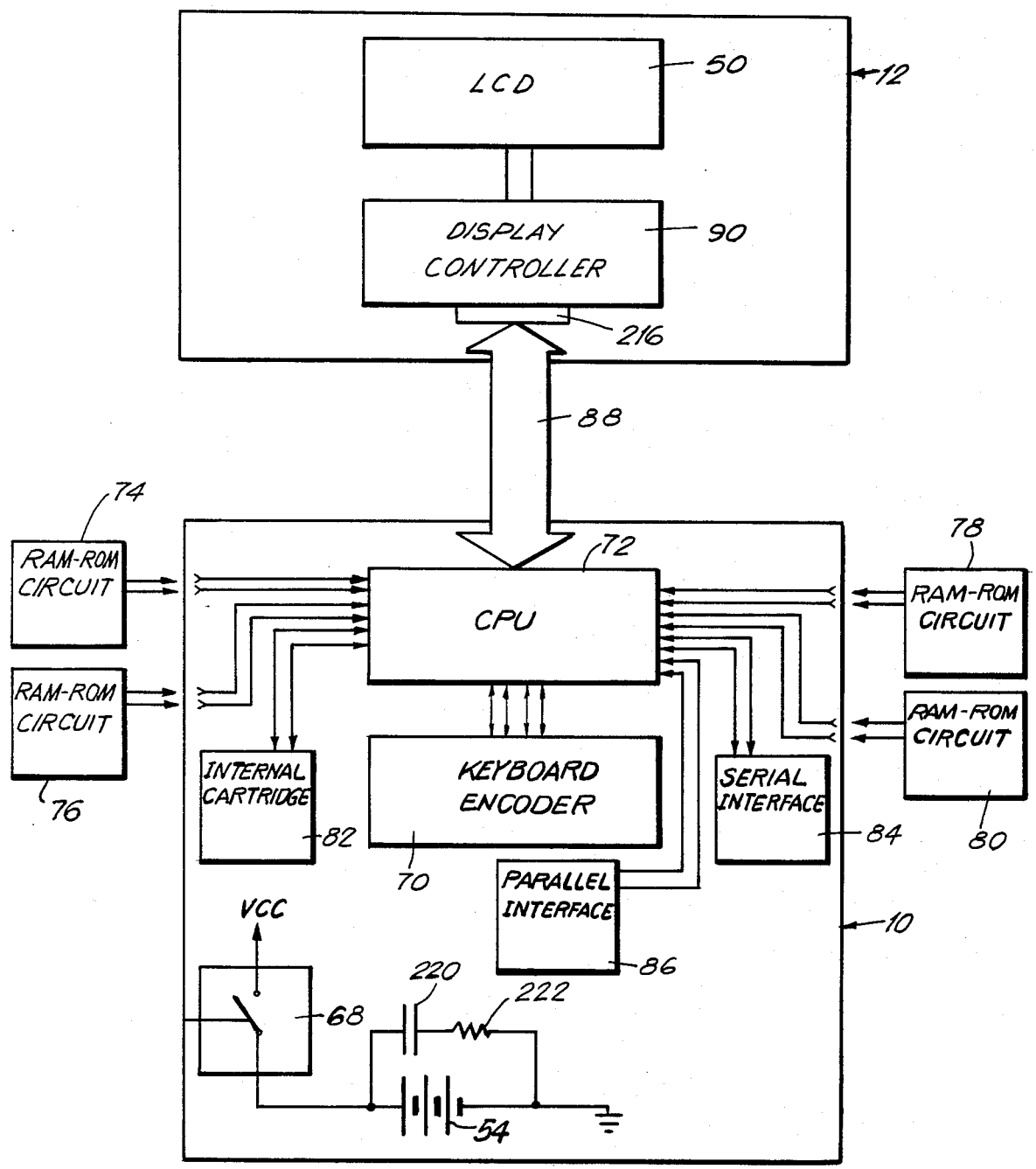
FIG. 3 is a block diagram of the computer in FIG. 1.

FIGS. 1, 2 and 3, illustrate a computer embodying feature of the invention. In FIGS. 1 and 2, a base 10 supports a lid or cover 12 by means of two hinges 14 and 16 that allow the cover 12 to swing from a closed position as shown in FIG. 2 to an open position as shown in FIG. 1. The base 10 and the cover 12 form a case that, in the closed position, completely encapsulates the computer and allows it to be carried or stored. According to an embodiment of the invention, the outer dimensions of the closed casing approximate 11"×8"×3".

The base 10 holds a keyboard 14 composed of approximately 73 alphanumeric and function entry keys 16. Four chambers 18, 20, 22, and 24 are adapted to receive four cartridges 26, 28, 30, and 32. Each of the cartridges 26, 28, 30, and 32 terminates at its lower end in conductors at the edge of a printed circuit board. The conductors on each cartridge form a connector that mates with a jack or receptacle in each chamber. Each jack or receptacle is mounted on the computer system's main printed circuit board and contains a number of spring conductors that contact the conductors on the cartridge connector to provide current paths from the cartridge's circuit board to the main circuit board. Four cartridges are shown, although only one or two need be used at a particular time during operation. The cartridges are selectively pluggable and removable to furnish data to the computer, to receive data from the computer, or to exchange data with the computer.

The cover 12 includes two sidewalls 34 and 36 as well as an end wall 38 and, when closed, overlies substantially the entire upper face 40 of the base 10. For this purpose, the hinges 14 and 16 are composed of two upstanding bearings 40 and 41 at the very rear of the base 10. The bearings lie between two pairs of bearings 42 and 43 at the rear of the cover 12. Hinge pins pass through the base bearings 40, 41 and the cover bearings 42, 43. According to a preferred embodiment of the invention, the hinge members engage each other with a friction fit so that the angle of the lid 38 relative to the base 10 may be infinitely adjusted to the user's convenience. A suitable stop on the periphery of the bearings 40 and 41 establishes a maximum angle, such as 150°, to which the cover may be opened.

Figure 6:
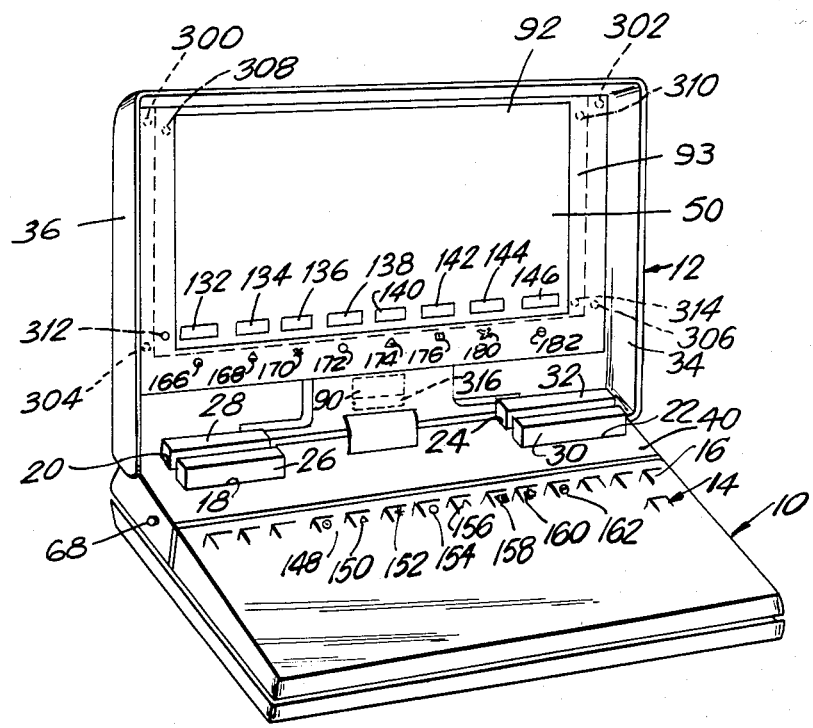
FIG. 6 is a perspective view of another battery-operated computer having a screen of eighty columns and 25 lines.

On its interior face, the lid 12 carries a liquid crystal display of eighty columns or characters and preferably 8 lines. According to a preferred embodiment of the invention, the liquid crystal display contains eighty columns and 24 or 25 lines of alphanumeric and other symbols. This is shown in FIG. 6.

Suitable wiring behind a protective sheath 52 connects the circuitry in the base 10 with that in the cover 12. A removable battery pack 54, with a charging jack 56 arranged to receive a plug from a charging source, fits into the rear of the base 10. A parallel interface jack 58, also at the rear of the base 10 serves to interface with a printer or external disc drive (such as a Winchester drive) and a serial jack 60 serves to connect to a modem. A panel 62 is removable for insertion of a memory expansion module. The back of the base 10 further includes a reset button 64 and a speaker opening 66.

A main switch 68 mounted in the base 10 lies in the path of the wall 36. In the closed position, the cover 12 keeps the switch 68 open. Opening the cover immediately powers up the system.

FIG. 3 illustrates the circuitry of the devices of FIGS. 1 and 2 in simplified block diagram form. In the base 10, a keyboard encoder 70 responds to the keyboard 14 and a central processor unit 72 to transmit the data entered in the keyboard 14 to the central processor unit or CPU 72. The latter operates with the data from the cartridges' RAM and/or ROM circuits 74, 76, 78, and 80, respectively mounted in the cartridges 26, 28, 30, and 32. The CPU 72 further communicates with an internal cartridge 82 that stores system software and software that characterizes the CPU for a particularly language, such as German, Norwegian, French, English, Greek, etc. Serial interface circuit 84 and parallel interface circuit 86 also connect to the CPU and the jacks 60 and 58.

On the basis of the information in the CPU 72, a series of lines 88 connect to a display controller 90 that operates the LCD 50. The liquid crystal display 50 with its circuitry in the rear forms a module 92 that, with the controller 90 is mounted in recesses in the cover 12. A bezel 93 covers the edges of the module 92 to hold it while exposing the module to viewing.

The circuitry is, according to a preferred embodiment, in the form of printed circuit boards containing semiconductor chips, preferably of the CMOS type. The CPU 72, encoder 70, and interface 84 and 86 are part of the main printed circuit board in the base 10.

The CPU 72, keyboard encoder 70, parallel interface circuit 86, and serial interface circuit 84 correspond to such devices in any of a number of computer systems now in existence, such as the IBM PC computer available from International Business Machines Corporation, the TRS 80 Computers of the Tandy Corporation, etc. The CPU 72, keyboard encoder 70, parallel interface circuit 86, and serial interface circuit 84 interact in substantially the same manner as in these computers. Similar devices and their interaction are described, for example, in the technical manual of the Colonial Data Corporation for the SB 80 Single-Board Computer, published in 1981 by the Colonial Data Corporation, the Osborne User's Guide, published by the Osbourne Computer Corporation in 1981, etc. The display controller 90 and LCD module 92 correspond to that used in the TRS 100 portable computer of Tandy Corp. and are available from Hitachi Limited. The signal which the CPU 72 supplies to the display controller 90 are the same as those furnished by a CPU to a controller at an ordinary cathode ray tube (CRT) display. Thus the elements 50, 70, 72, 84, 86, 90, 92 can be constructed and interconnected from known devices in a known manner. Construction of small computers is disclosed in the book 8085 Cookbook written and copyrighted by Titus, Larson, and Titus, (copyright 1980), published by Howard W. Sams & Co., Inc. of Indianapolis, Ind., First Edition, Second Printing 1981.

In the present system the cartridges 26, 28, 30, and 32 are composed of CMOS semiconductor chips on printed circuit boards. They replace so-called floppy discs and disc drives, cassette players, or hard discs normally used with microcomputers or personal computers for storing variable information files and software. Also, the liquid crystal display 50, LCD module 92 and controller 90 replace earlier CRT displays. The use of ROMs, RAMs or both is well-known with a storage of programs or files. RAMs are available for this purpose as so-called RAM discs such as are available from the Semi-disc Corporation of Beaverton, Oregon. These RAM discs are actually semiconductor devices that have memory capacities equal to or larger than normal program floppy discs, up to one megabyte. The invention contemplates that cartridges 26 to 32 correspond functionally to such RAM discs or software cartridges, but to have memories from 8 to 64 kilobytes. This makes them small enough to fit in the chambers 18 to 24 of the base 10. As such they store and reproduce data corresponding to that which a CPU would apply to and receive from the disc drive system. Effectively, the cartridges and their internal structure operate as transferable and replaceable disc drives.

As with RAM discs, the cartridges 26 to 32 contain circuits 74 to 80 whose data is formatted and structured exactly as the data on a disc drive arrangement. Hence the CPU 72 doesn't "know" whether a disc drive or cartridge is there. The difference lies in the much faster response time of the semiconductor circuits 74 to 80.

However, RAM discs do have disadvantages, namely they derive all the power which they use from the computer system or a separate power supply. Thus, RAM discs consume valuable power not only when the system interacts with the RAM discs, but also while the computer system is shut off. Once RAM discs are disconnected from the system, the data stored in lost unless it is still plugged in, to a power source.

According to a preferred embodiment of the invention, the cartridges include not only the semiconductor ROMs and RAMs, but are composed of static CMOS ROMs and RAMs as well as small batteries within the cartridge walls and which are continuously applied to the RAMs to make them non-volatile. Preferably high density Lithium-Manganese batteries are used. This embodiment is based upon the recognition that static CMOS RAMs operate in several modes among which are the read-write mode and the data retention mode, and that in the data retention mode they require less than 1/10,000th of the power needed in the read-write mode.

Figure 4:
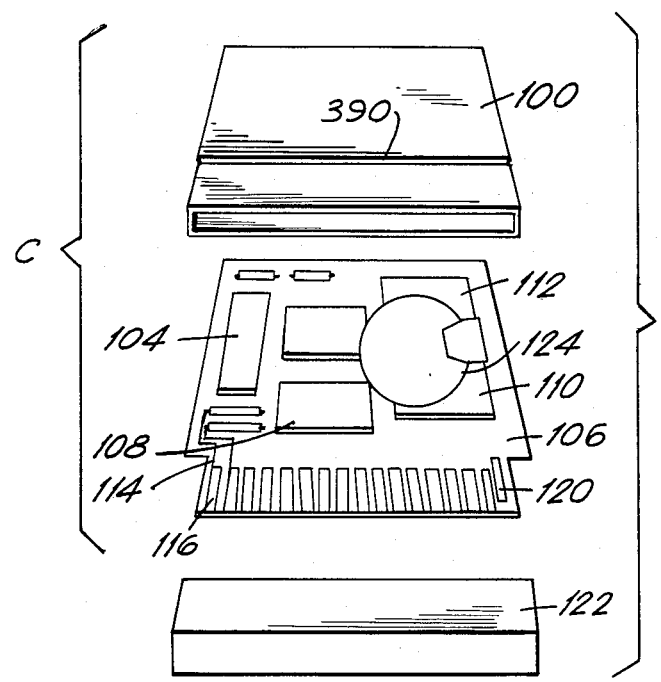
FIG. 4 is an exploded view of a cartridge used with the computer in FIG. 1 and a connector receptacle at the base of the cartridge chambers.

A cartridge according to the invention is illustrated in the exploded view of FIG. 4 together with an edge receptacle of the type that appears at the base of one of the chambers 18 to 32. Here, the cartridge C corresponds to any one of the cartridges 18 to 32. A cartridge envelope 100 surround a printed circuit board 102 composed of at least one CMOS ROM such as the 65,536 bit UV erasable and electrically programable read only memory designed MBM 27C64-25 and MBM 27C64-30 available from Fujitsu Limited and described in the published specification of Fujitsu Limited dated Feb. 1982. Another embodiment of the cartridge includes one or more RAMs such as the 2048-word by 8-bit high speed static CMOS RAMs or $8192 \times 8$ bit high speed static CMOS RAMs available from Hitachi Limited and identified as HM6117LFP-3 and HM6264LP 10/12/15 in the Hitachi catalogue published in 1982 by Hitachi Limited. The Select integrated circuit (I.C.) is identified as 104 and the RAMs as 106, 108, 110, and 112. The printed circuit board contains wiring 114 to interconnect the Select I.C. and RAMs 104 to 112 and 17 contacts 116 which are aligned near the front edge 118 of the printed circuit board 102. An additional edge contact 120 is recessed from the edge by an additional distance of approximately ⅛ inch. Eighteen connectors appear on the bottom face of the edge of the board 102 and all approach the front edge of the board evenly. The contacts 116 and both above and below the board 102 connect the ROMs and RAMs in the usual manner to the CPU board through a connector receptacle 122 mounted on the main printed circuit board of the computer. The receptacle 122 includes spring contacts that wipe against and intimately connect the contacts 116 and 120. The positioning of the contact 120 on the upper face of the board 102 assures that all the other contacts 116 first connect to the receptacle for jack 122 before the contacts 120 actually make their connection. The contacts 120 connect ultimately to the power source of the computer. This sequential contacting arrangement makes sure that proper connections are made at all terminals before the full power is applied to the cartridge. A lithium-manganese battery 124 supplies power to the RAMs in the memory retention mode when power is not supplied by the main computer to the cartridge. This occurs for example when the computer is not being used or when the cartridge is removed from the computer. This renders the information in the cartridge non-volatile.

The voltage of each battery is, for example, 3 volts, i.e., less than the voltage needed for a read-write operation, but large enough to retain data. The voltage Vcc of the CPU 72 and the remainder of the system is 5 volts and overrides the 3 volts supplied by the batteries when the circuits go into the read-write mode.

Ordinarily, one would expect the battery soon to run down in this environment. However, the inventor has recognized that although such a battery possesses a capacity of only 200 milliampere hours and would last only a few hours in the read-write mode, the very low current drain of the RAMs in the data retention mode gives the battery a life over 10,000 times longer. Hence, the expected life of the battery is greater than 5 years.

In the read-write mode, the RAMs are operated through the voltage supplied through ground and the contact 120 from the battery pack 54.

As stated, when the cartridge is placed in the jack 122 the contact 120 makes last and breaks first its corresponding spring contact in the jack 122.

According to an embodiment of the invention, one of the cartridges 26 to 32 could contain a combination of ROMs that makes it operate as an edit cartridge comparable to a software edit disc similar to that which might be available under the trademarks Word Star, Perfect Writer, Select, etc. Another of the cartridges is arranged to operate as a file cartridge and thereby receive data corresponding to a file which is being typed in response to the edit disc. In this regard, it operates with the edit cartridge in the same manner as an empty file disc operates with a word processing program to store letters and documents. That is to say, an operator can type a letter by entering the words into the keyboard 14. The keyboard encoder 70 transmits the information to the CPU 72 which, on the basis of data from an edit cartridge, such as 76, causes the display controller 90 to display information on the liquid crystal display 50. At the same time, the CPU stores information in the file cartridge, such as 30, which is plugged into the jacket in the chamber 22. The operation is precisely that of a microcomputer or so-called personal computer, except that cartridges, such as 26 to 32, are used in place of disc drives and the liquid crystal display substitutes for the CRT display in the personal computer. The cartridges are transparent to the signals that would normally go to disc drives. On the other hand, they operate at a much faster rate because the sensing or writing of information takes place electronically with no delay rather than with the loss in time entailed by the rotation of the magnetic medium. The cartridges perform in microseconds what can take seconds to accomplish with discs and disc drives.

When operating in any one of the operating modes, such as the edit mode, the software in any of the cartridges, such as the edit cartridge produces a so-called menu. This corresponds to the menu produced in the many word processing programs. The menu constitutes a selection to be performed by the operator. For example, a word processing program may ask whether the user wishes to create a new document, edit an existing document, delete an existing document, print a document, etc. The usual instructions are for the user to press particular keys for each function. For example, in one program a user presses the key E to edit a document, C to create a document, P to print a document, D to delete a document, etc. Once a selection has been made, such as to edit a document, a second menu may appear. This menu may require a user to press the letter I to insert a passage, a letter Q to quit the editing operation, etc. The program may require several keys to be pressed simultaneously or in sequence. Selecting these letters may be cumbersome, particularly if the letter keys do not correspond to any letters in the function to be performed, or the user is unfamiliar with the command structure.

According to the present embodiment, the bottom of the liquid crystal display 50 is the location of a menu line 130. The menu line is composed of up to 8 menu labels 132 to 146. Each label indicates a function. However, instead of requiring the operator to press predetermined letters, 8 keys 148 to 164 are dedicated specifically to make the choice on any particular menu label. For this purpose, each of the keys 148 to 164 is designated with a symbol. Imprints 166 to 182 on the cover 12 below the liquid crystal display 50 immediately underneath each of the corresponding labels form symbols identical to those on the keys 148 to 164. Thus, if an operator wishes to select a function appearing at the label 138 he presses the key 154 having the same symbol as the imprint 172 directly beneath the label 138. When the menu line changes and different labels appear the operator again need only be concerned with the symbol in the vicinity of the menu label and press the key with the corresponding symbol and thereby cause the computer to perform the function then indicated. Because the labels 132 to 146 are aligned with the symbols 166 to 182 and the symbols 148 to 164 follow the same sequence as the symbols 166 to 182, the entire procedure is simplified for the operator.

In operation, when the cover 12 is in the closed position, the wall 36 keeps the switch 68 open. However, the batteries 124 in the cartridges 26 to 32 continue to energize the RAMs in the data retention mode. When the user starts opening the cover the wall 36 releases the switch 68 thereby closing it, and the battery pack 54 in the computer powers up the computer. In fact, the CPU 72 has the opportunity to go through well over a million steps in less than one second and interrogate each portion of the computer as to its condition, as well as to interrogate the circuits of whichever cartridges are in place, well before the operator has a chance to adjust the cover to its maximum backward position or to whatever position is comfortable for optimum viewing of the display 50. By that time, the CPU has caused the display controller 90 to produce an indication of what programs are available from all cartridges which happen to be plugged in at that time. Because the cartridges contain semiconductor devices and do not rely upon mechanical and electromechanical operation, the scanning operation may take less than a few thousandths of a second and result in a display of all available programs with a menu line 130 and menu labels 132 to 146 requesting a selection by the operator. By pressing the appropriate function key designated by the symbol directly beneath the function chosen by the operator, the operator can then proceed to utilize the computer as he wishes.

In any ordinary computer, the choice may have to be made by pressing a particular alphabetic button, or it may require the typing of the particular phrase or may require successive discs to be loaded. An ordinary system also requires the operator to place a proper disc in the system. For example, if a word processing program such as Word Star is placed in the one of the disc drives of a computer and the operator wishes to use the program, he or she must initiate the read operation before receiving a menu. According to the invention if a word processing cartridge is in place in any of the four chambers 18 to 24 of the computer, this will appear with no perceptible delay at one of the labels 132 to 146 and an operator need merely press the function key whose symbol corresponds to the symbol below the program to be selected. The response is virtually immediate.

Thereafter, the operator may for example follow the menu line and then create a document in the CPU memory and later store it in a file cartridge that has been plugged in. Mistakes can be deleted in accordance with the ordinary use of a word processor. When a document is completed, the file can be read in the same manner as an ordinary disc and transmitted by the CPU to a printer with the serial or parallel output ports 58 or 60. Alternately, the file cartridge can be inserted into another machine for printing further processing or transmission to another location or computer.

To end any session and turn off the machine the user need merely close the cover which opens the switch 68 and initiates the power down sequence.

In a preferred embodiment of the invention, the operating system of the computer is CP/M or CP/M compatible. CP/M is the trademark of Digital Equipment Corporation.

Figure 5:
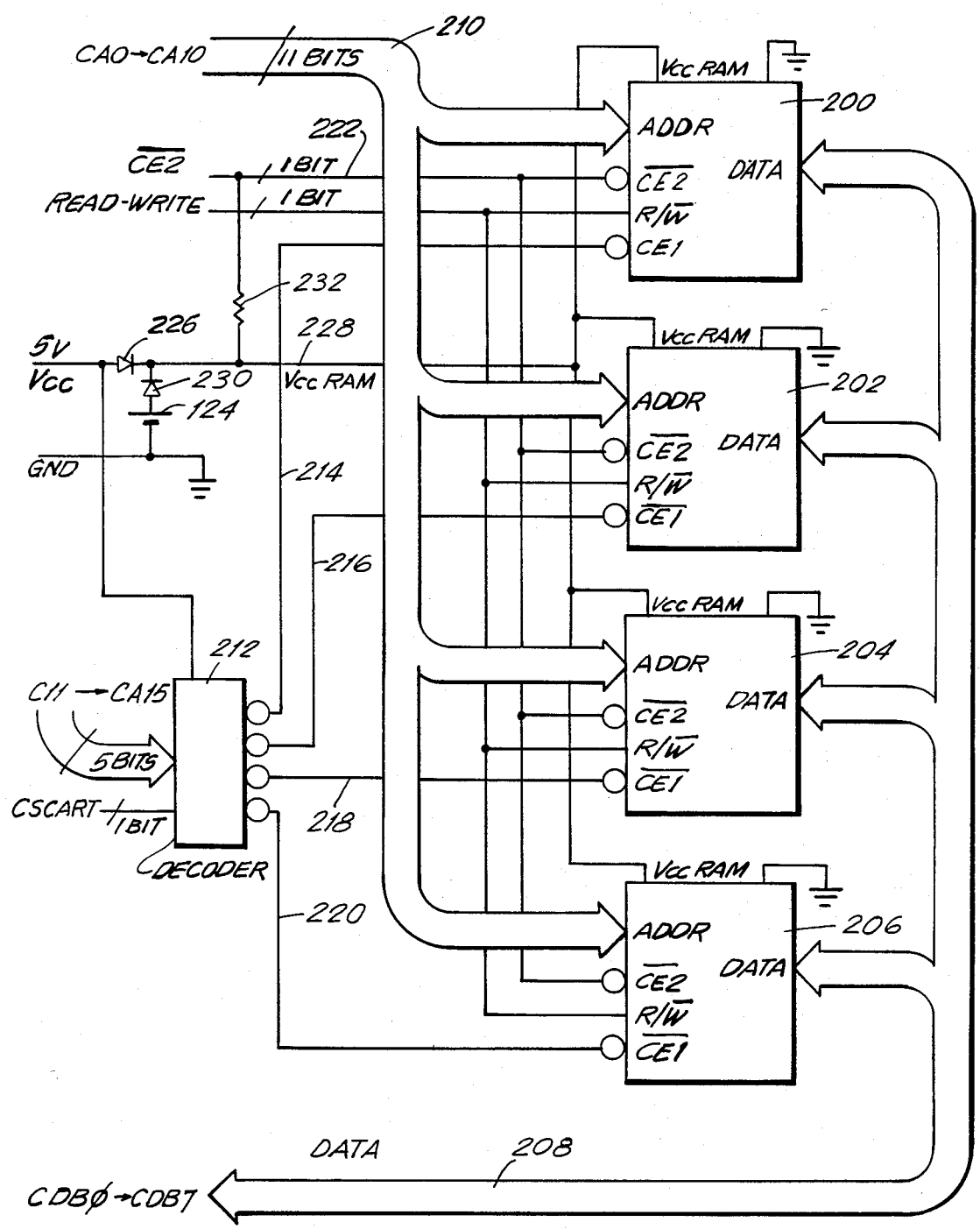
FIG. 5 is a block diagram of the cartridge in FIG. 4 with connections to the central processor unit.

FIG. 5 is a block diagram of the circuitry 74, 76, 78, or 80 in one of the cartridges 26, 28, 30 or 32. In this case, the cartridge contains a 8 K memory. In the circuit, four RAMs 200, 202, 204 and 206 each receive and transmit data on eight data lines CDB 0 to CDB 7 that form a data bus 208. According to an embodiment of the invention each RAM is a 2048 word by 8 bit high-speed static CMOS RAM identified as HM6117LFP-3 or HM6117LFP-4 and manufactured by Hitachi Limited. Such devices are described for example in the catalog published by Hitachi in 1982, page 141. The data bus 208 applies its signal to eight data terminals in each of RAMSs 200 to 206.

Eleven address lines CA 0 to CA 10 form a bus 210 and address eleven address terminals on each of the RAMs 200 to 206. Five selector lines CA 11 to CA 15 determine which of the four RAMs 200 to 206 are to be addressed through a decoder 212 that at any time produces an enable signal at a terminal $\overline{CE\ 1}$ in one of the RAMs 200 to 206. The five bits into the decoder 212 represent one of the RAMs 200 to 206 and the decoder 212 uses that information to select one of the lines 214, 216, 218 or 220 to the terminals $\overline{CE\ 1}$ in the RAMs 200 to 206.

A read-write signal is applied to each of the RAMs to determine whether the addressed location in the selected RAM is to be read or to write. A signal $\overline{CE\ 2}$ on a line 222, appears at a terminal $\overline{CE\ 2}$ and, when high, causes the RAMs 200 to 206 to ignore the inputs. This places the RAMs 200 to 206 in the data retention mode.

A five volt source Vcc powers the RAMs through a diode 226 and produces a voltage VccRAM between a line 228 and ground. When the voltage Vcc is absent, such as occurs when the computer is off, the battery 124 supplies its voltage to the line 228 and hence to the power terminals of the RAMs 200 to 206 through a diode 230. The diode 230 prevents the five volt voltage Vcc from effecting the battery 124. The voltage Vcc is applied directly to the decoder 212.

The decoder 212 also receives a signal CSCART which determines whether the particular cartridge is to be addressed at all.

In operation, the signal CSCART selects a cartridge and enables the decoder 212. The latter then uses address signal CA 11 to CA 15 to select which of the RAMs 200 to 206 is to be addressed. The signal CA 0 to CA 10 determine which address in the addressed RAM is to receive or transmit data along the data bus 208. A read-write signal applied to the terminal's $R/\overline{W}$ in the RAMs 200 to 206 determines whether the RAM will be writing or reading. A signal $\overline{CE\ 2}$ places the RAMs in the read-write mode or the data retention mode.

In normal operation, while the computer is on, a signal VccRAM is applied to each of the RAMs 200 to 206 along the line 228. This voltage is derived from the voltage Vcc through a diode 226. When the computer voltage Vcc is off, or run down, the battery 124 maintains the data in the RAMs 200 to 206 through a diode 230. The diode 230 protects the battery 124 from the voltage Vcc.

A resistor 232 ordinarily biases the line 222 and the terminal $\overline{CE\ 2}$ high, with the voltage VccRAM derived either from the voltage Vcc when computer power is applied to the cartridge, or with the battery 124. The battery 124 normally starts at its life at 3 volts but gradually deteriorates to about 2 volts. The latter is still sufficient to place a high, data retention mode, signal on terminal $\overline{CE\ 2}$. To set the terminal low, a low must be applied to the signal line $\overline{CE\ 2}$ by the computer.

While different reference numerals have been used, the cartridge in FIG. 4 is the same as or corresponds to the cartridge in FIG. 5. The RAMs 200 to 206 correspond to RAMs 106 to 112 and the decoder 212 is the select chip 104.

According to another feature of the invention, the cartridge of FIG. 5 is increased in capacity by substituting 8192 word by 8 bit high speed static CMOS RAMs for the RAMs 200 to 206 in FIG. 5. With virtually no increase in size of the cartridges, the capacity is then increased to 32 kilobytes. The cartridges are substantially "matchbook" size. That is, those in FIGS. 4 and 5 and those of the present embodiment are 2 $\frac{1}{4}'' \times \frac{5}{8}'' \times 2\frac{3}{8}''$.

According to another embodiment of the invention, the 16 kilobyte cartridges are composed of a system such as that shown in FIGS. 4 and 5, but using 8192 word by 8 bit high speed static CMOS RAMs.

These small sizes make it possible to produce a fast computer system having a display corresponding in size to a CRT display and having an internal and external capacity of an ordinary personal computer.

Figure 7:
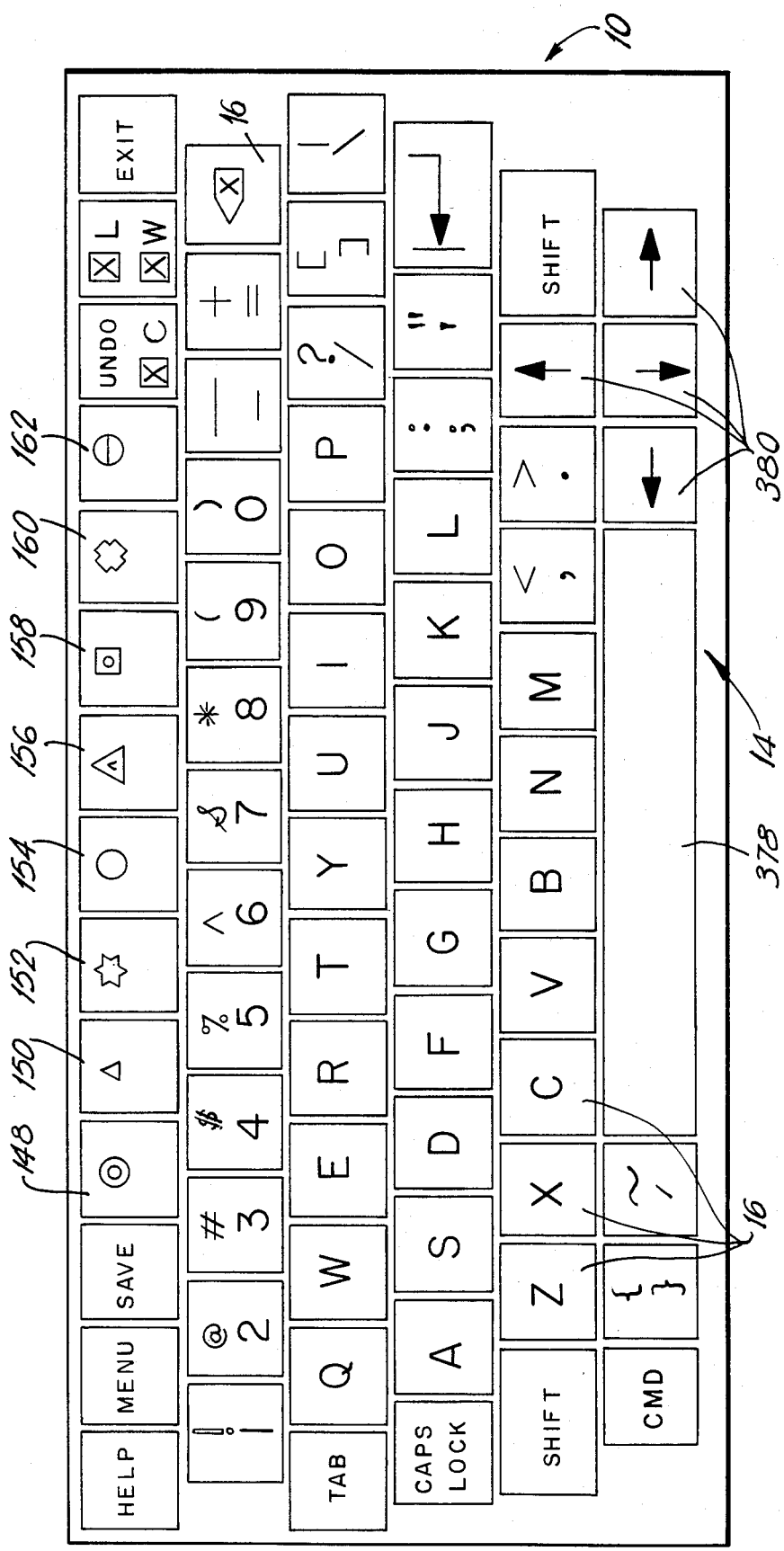
FIG. 7 is a top view showing the layout of the keyboard in FIGS. 1 and 6.

The keyboard according to the invention includes keys whose sizes and operation correspond to those of an ordinary personal computer, such as the PC computer manufactured by International Business Machines Corporation. The stroke of each of the keys is also substantially the same. The keyboard layout is shown in FIG. 7.

FIG. 6 illustrates another embodiment of the invention which is identical to the embodiment of the invention shown in FIGS. 1 to 3 except that the display 50 has 24 lines instead of 8. In FIGS. 1 and 6, four screws 300, 302, 304, and 306 all of which are covered by suitable masking means hold the bezel in place. Furthermore, four additional screws 308, 310, 312, and 314 secure the display module 92, outlined in phantom lines, against the case's cover 12. The module 92 is removable as a unit together with the display controller 90 which is disconnectable from the wiring to the CPU 72 by a male-female connector 316. (See FIGS. 6 and 3). As such, a user may replace the combination of the bezel 93, module 92, and controller 90 with another module controller and bezel. This permits the user to upgrade the system from an 8 lines display to a 16 line display, a 24 line display, or a 25 line display. This can be done by removing the screws 300 to 314 that hold the bezel 93 as well as the module 92 and disconnecting the connector 316. A substitute arrangement of module, bezel, and controller can then be mounted to afford the user a larger or different display.

According to an embodiment of the invention, the switch 68 is in the form of an optical sensor which operates a relay or semiconductor switching arrangement. A capacitor 320 of substantial size such as 0.047 farads in series with a resistor 320 which may have a value of 1 K are connected across the terminals of the battery pack 54. This arrangement permits removal of the battery pack 53 for a period of time such as 20 to 30 minutes. The impedance of the computer circuitry allows the capacitor 320 to maintain its charge for that long time period. This arrangements permits the battery pack 54 to be removed while the computer is in operation, or between operations, so that it can be replaced by another battery pack or be recharged briefly. The resistor 325 prevents a large current surge to the capacitor 320 when a fresh battery 54 is inserted.

It has been possible to condense the entire arrangement, not by decreasing the key sizes, but by making the length of the spacebar 378 the length of six keys and placing the cursor keys 380 in the vicinity of the spacebar.

To make sure that a cartridge 26 to 32 is placed in the openings 18 to 24 in the correct position, the cartridge shells 100 are keyed with a 1/16" step 390 as shown in FIG. 4. The step is ½" back from the opening.

While embodiments of the invention have been described in detail it will be evident to those skilled in the art that the invention may be embodied otherwise without departing from its spirit and scope.

What is claimed is:

1. A computer, comprising:
   a central processing unit;
   a keyboard coupled to said central processing unit and including a plurality of entry keys for entering a full alphabet and ten digits;
   a display arrangement coupled to said central processing unit and including a liquid crystal display;
   a case having a base with an upper surface and an edge, and a cover hinged to said base at the edge and having an inner surface facing said base when closed and exposed to a viewer when opened;
   said base housing said central processing unit and said keyboard and exposing said keyboard for operation by a user when the cover is open and said cover housing said display and exposing said display on the inner surface when open and covering the entire upper surface when said case having an opening for forming a cartridge receiving chamber and having a connector connectable to circuitry in a cartridge and connected to said central processing unit.

2. A computer as in claim 1, wherein the opening and the chamber are in said base.

3. A computer as in claim 2, wherein the opening is in the upper surface of the base and said chamber is sufficiently deep so that a cartridge when connected with the connector allows closure of the cover against the base.

4. A computer as in claim 1, wherein the opening is on the upper surface of the base and said base includes an additional opening on the upper surface forming an additional cartridge receiving chamber, said additional chamber having a connector connectable for circuitry in a cartridge and connectable to the central processing unit, said connectors being located at surfaces of the chambers most remote from the upper surface, said chambers being sufficiently deep to allow circuitry of the cartridges to be connected to said connector while the cover covers the base.

5. A computer as in claim 4, wherein said base includes a plurality of sides and said cover includes a plurality of walls projecting from the edge of the surface facing the keyboard, said walls being arranged to cover a plurality of the sides of the base when the cover is closed.

6. A computer as in claims 2 and 4, wherein said base includes a plurality of sides and said cover includes a plurality of walls projecting from the edge of the surface facing the keyboard, said walls being arranged to cover a plurality of the sides of the base when the cover is closed.

7. A computer as in claim 1, wherein said central processing unit includes a switch and other portions of the central processing unit, said switch being arranged for electrically disabling said other portions of the central processing unit as well as said liquid crystal display and said keyboard, said switch being mounted in said base and including activating means in the path of said cover when said cover is closed so that said cover places said switch in a disabling position.

8. A computer as in claim 7, wherein said base includes a plurality of sides and said cover includes a plurality of walls projecting from the edge of the surface facing the keyboard, said walls being arranged to cover a plurality of sides when the cover is closed, said activating means being arranged for responding to one of said sides in the path of one of said walls.

9. A computer as in claim 2, 4, or 5, wherein said base includes a plurality of sides and said cover includes a plurality of walls projecting from the edge of the surface facing the keyboard, said walls being arranged to cover a plurality of sides when the cover is closed, said activating means being arranged for responding to one of said sides in the path of one of said walls.

10. A computer as in claim 1, wherein said base includes bearings upstanding from the upper surface at the end of said surface and said cover includes bearings on the inner surface facing said base at the end of the surface closest to said base, and wherein hinge pins articulatably connect the bearings with said hinge with the bearings on said base so as to hinge the cover relative to the base.

11. A computer as in claim 10, wherein said bearings are arranged to make the cover infinitely adjustable, said bearings on said cover or said base form a sufficiently tight friction fit with the bearings on the other of said base and said cover or with the hinge pins to cause said cover to assume an open position corresponding to the position in which a person using the computer last moved the cover.

12. A computer as in claim 9, wherein at least one of said bearings includes a stop for limiting the opening movement of said cover.

13. A computer as in claim 10, wherein at least one of said bearings includes a stop for limiting the opening movement of said cover.

14. A computer as in claim 1, 2, 4, 5, 7, 9, 11, or 12, wherein at least one of said bearings includes a stop for limiting the opening movement of said cover.

15. A computer as in claim 1, wherein a plurality of said keys are arranged as function keys for entering commands into said central processing unit to perform special functions, said function keys each being designated witn a predetermined symbol, said cover being designated with the symbols of said function keys at locations along an edge of said display, the functions to be entered by said function keys being variable on the basis of entry of other information to said central processing unit, said central processing unit being arranged for causing said display to list the functions being entered by the function keys at locations on the display adjacent the particular symbol corresponding to the symbol designated on a particular function key.

16. A computer as in claim 15, wherein said keys are aligned in rows, said function keys being located in the row closest to the cover when the cover is open.

17. A computer as in claim 2, 4, 5, 7, 9, 11, 12, 13, 14, or 16, wherein said keys are aligned in rows, said function keys being located in the row closest to the cover when the cover is open.

18. A computer as in claim 1, further comprising a cartridge having a shell and semiconductor circuitry within said shell, said cartridge being connectable and disconnectable from said central processing unit, said semiconductor circuitry including read-write memory operable in a read-write mode and a data retention mode, said memories being arranged for receiving energy from said central processing unit, and a battery in said shell for supplying energy to said memories sufficient to keep the memories in the data retention mode in the absence of energy from said central processing unit.

19. A computer as in claim 18, wherein said read-write memories are static memories.

20. A computer as in claim 19, wherein said memories are CMOS memories.

21. A computer as in claim 18, further comprising a second cartridge having a shell and a semiconductor circuit and connectable and disconnectable from said central processing unit.

22. A computer as in claim 21, wherein said second cartridge includes a CMOS static read-write memory operable in a read-write mode and data retention mode, the circuitry of said second memory being arranged to receive energy from said central processing unit in the read-write mode, said second cartridge including a battery in the shell for maintaining the circuitry in a data retention mode when the entry from the central processing unit is reduced below a predetermined value.

23. A computer as in claim 18, wherein said cartridge includes a diode in series with said battery for blocking voltage from said central processing unit to said battery.

24. A computer as in claim 22, wherein each of said cartridges includes a diode in series with each of said batteries for blocking flow of current from said central processing unit to said batteries.

25. A computer as in claim 18, wherein said base has an opening in the upper surface for forming a cartridge receiving chamber, said chamber having a cartridge connector connectable to the circuitry in said cartridge and connected to said central processing unit.

26. A computer as in claim 21, wherein the upper surface of the base includes a plurality of openings forming a plurality of cartridge receiving chambers, said chambers each having a connector connectable to the circuitry in the cartridges and connected to the central processing unit, said connectors being located at surfaces of the chambers most remote from the upper surface, said chambers being sufficiently deep to allow the circuitry cartridges to be connected to said connector while the cover covers the base.

27. A computer as in claim 5, 7, 8, 10, 11, 12, 13, 14, 15, 16, 18, 19, and 21, wherein said second cartridge includes a CMOS static read-write memory operable in a read-write mode and data retention mode, the circuitry of said second memory being arranged to receive energy from said central processing unit in the read-write mode, said second cartridge including a battery in the shell for maintaining the circuitry in a data retention mode when the entry from the central processing unit is reduced below a predetermined value.

28. A computer as in claim 1, wherein said keyboard includes alphanumeric keys and a space key and said space key is six alphanumeric keys wide.

29. A computer as in claim 28, wherein said keyboard includes cursor keys adjacent and aligned with said space key.

30. A computer keyboard, comprising a plurality of alphanumeric keys and a spacer key, said space key being six alphanumeric keys wide.

31. A computer keyboard as in claim 36, further including cursor keys adjacent and aligned with said space key.

32. A computer as in claim 1, wherein said base forms a battery chamber having a pair of connectors connected to said central processing unit, said display arrangement, and said keyboard, said battery chamber being arranged for receiving a battery and said connectors being arranged for coupling to the battery.

* * * * *